(12) United States Patent
Yehoshua et al.

(10) Patent No.: US 9,076,143 B1
(45) Date of Patent: Jul. 7, 2015

(54) SYSTEM AND METHOD FOR MULTIPLE USER ADVERTISEMENT ACCOUNTS

(75) Inventors: Tamar Yehoshua, Palo Alto, CA (US); Betina J. Chan, San Francisco, CA (US); Yoni Rosenbaum, Redwood City, CA (US)

(73) Assignee: A9.com, Inc., Palo Alto, CA (US)

( * ) Notice: Subject to any disclaimer, the term of this patent is extended or adjusted under 35 U.S.C. 154(b) by 2876 days.

(21) Appl. No.: 11/411,001

(22) Filed: Apr. 25, 2006

(51) Int. Cl.
*G06Q 30/00* (2012.01)
*G06F 15/16* (2006.01)

(52) U.S. Cl.
CPC ............... *G06Q 30/00* (2013.01); *G06F 15/16* (2013.01)

(58) Field of Classification Search
USPC .......................................................... 709/205
See application file for complete search history.

(56) References Cited

U.S. PATENT DOCUMENTS 6,532,488 B1 * 3/2003 Ciarlante et al. .............. 709/205

* cited by examiner

*Primary Examiner* — Saba Dagnew
(74) *Attorney, Agent, or Firm* — Lee & Hayes, PLLC (57) ABSTRACT

A multiple user advertisement account system includes an advertisement account database for storing information related to the account. The system is configured to grant multiple users access to the account and allow the users to view or update the information stored in the account database. The system tracks the updates to the information and generates a display of an activity log that contains entries related to the updates received.

38 Claims, 7 Drawing Sheets

SYSTEM AND METHOD FOR MULTIPLE USER ADVERTISEMENT ACCOUNTS

BACKGROUND

Advertisements are often provided via a network, e.g., displayed on web pages via the internet. As network capabilities have grown during recent years, so has the ability of various types of entities to effectively market their services and/or products using network resources. Typically, the advertisements are managed through the use of a system that may be accessible by advertisers, publishers, consultants, and/or other third parties.

Advertisement systems allow users to create advertisement accounts through which the users may in turn create advertisements, specify keywords, bid on keywords, coordinate billing activity, oversee the activity related to campaigns and advertisements created under the account, monitor various performance parameters, etc. Advertisement systems may also allow, among other things, advertisers to create and manage advertisements to be placed on web pages published by other entities (e.g., publishers), and conversely, allow publishers to offer their web pages to be used as hosts for advertisements created and managed by others (e.g., advertisers).

Because of the wide variety of activities that are related to creating and managing advertisement accounts, it is often desirable for advertisers and publishers to allow more than one user to access their accounts. For example, in an effort to maximize the return on the investment in advertising activity, an advertiser may choose to hire an external consultant (e.g., a search engine marketer) to assist in the design of the advertisement, the choice of keywords, the bid amounts, etc. The advertiser may therefore want the consultant to be able to access the advertisement account. The advertiser may also have various internal personnel that require access to the account, including marketing personnel to coordinate activities with the consultant, and finance personnel to arrange for bill payment. It may be desirable to provide other internal and/or external users with the ability to access the advertisement account.

An ongoing need exists for systems and methods that facilitate providing multiple users access to, an account, such as an advertising account. Other features and advantages will be made apparent from the present specification. The teachings disclosed extend to those embodiments that fall within the scope of the appended claims, regardless of whether they accomplish one or more of the above-identified needs.

SUMMARY

One exemplary embodiment relates to a computer-implemented advertisement system for network-based advertising. The system may include an accounts database for storing various types of information related to an advertisement account. The system allows users to access the account, and the system updates the information stored in the accounts database in response to various inputs that may be received from users. Each user may have the same or substantially the same level access for some or all aspects of the account. The system also generates and displays an activity log that includes entries having information (e.g., a user name, a time, a date, etc.) relevant to specific user inputs.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF EXEMPLARY EMBODIMENTS

Figure 1:
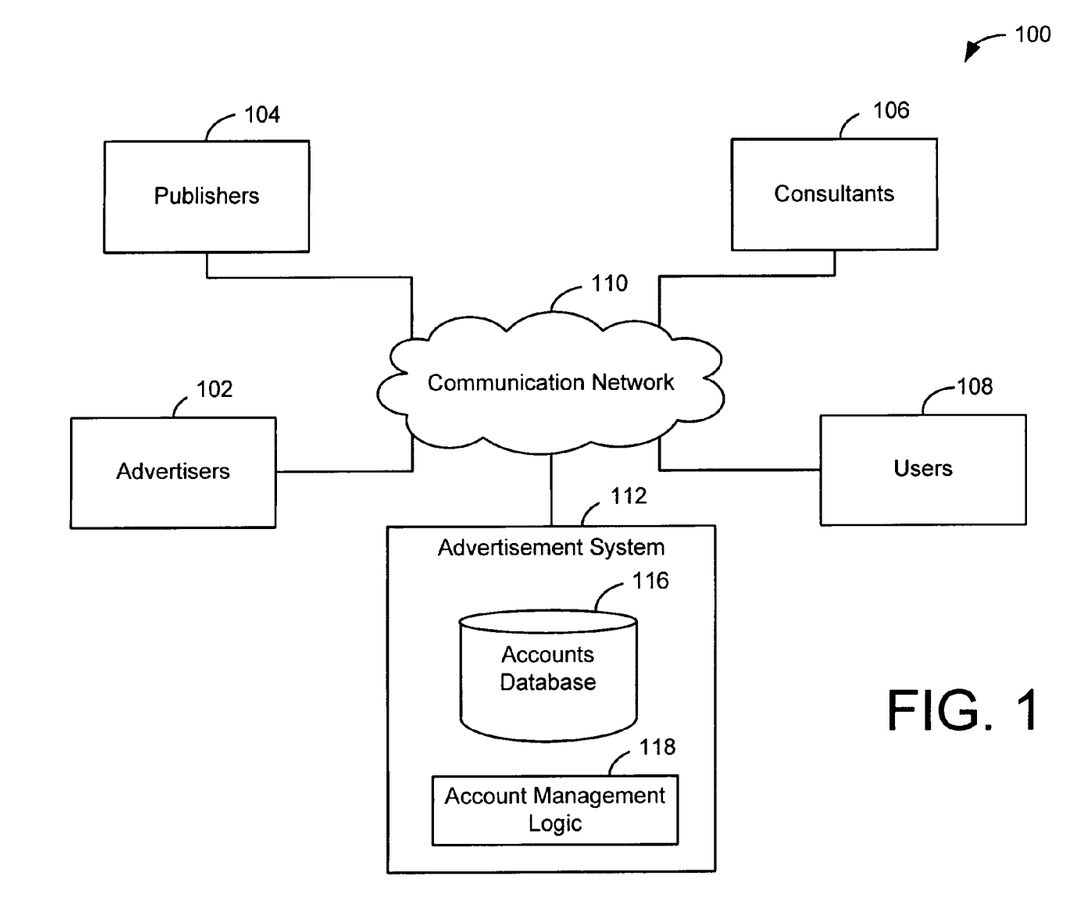
FIG. 1 is a schematic of a multiple user advertisement system according to an exemplary embodiment.

Referring to FIG. 1, a system 100 according to an exemplary embodiment is shown. System 100 includes one or more advertisers 102, one or more publishers 104, one or more consultants or other third party services (e.g., a marketing consultant), shown as consultants 106, one or more users 108, and an advertisement system 112. Advertisers 102, publishers 104, consultants 106, users 108, and advertisement system 112 may each include one or more computers that are connected to each other by way of a network 110, such as the interne.

Users 108 are able to view advertisements made available by a number of advertisers 102 and publishers 104 through network 110. Advertisers 102 may offer products, services, or other items for sale by advertising on the displays of publishers 104, or may engage in other types of advertising (e.g., political advertising, issue-based advertising, and so on). Consultants 106 may assist advertisers 102 in generating the advertisements to be displayed on, for example, web pages of publishers 104. Consultants 106 may also assist publishers in selecting the types of advertisements to be included as a part of the publisher's display. Advertisement system 112 includes an accounts database 116 that may further comprise a number of individual advertisement accounts (not shown). Advertisers 102, publishers 104, and consultants 106 generate, access, and manage accounts database 116 via network 110. Advertisement system 112 makes advertisements available to users 108 via network 110. In FIG. 1, advertisers 102, publishers 104, and consultants 106 are shown as being distinct entities. However, in practice a single entity may act as one or more of an advertiser 102, publisher 104, and/or consultant 106. For example, each of these entities may play different roles in different circumstances. Further yet, each of advertisers 102, publishers 104 and consultants 106 may comprise distinct sub-groups of users that separately access advertisement system 112. Other users may additionally access advertisement system 112.

Figure 2:
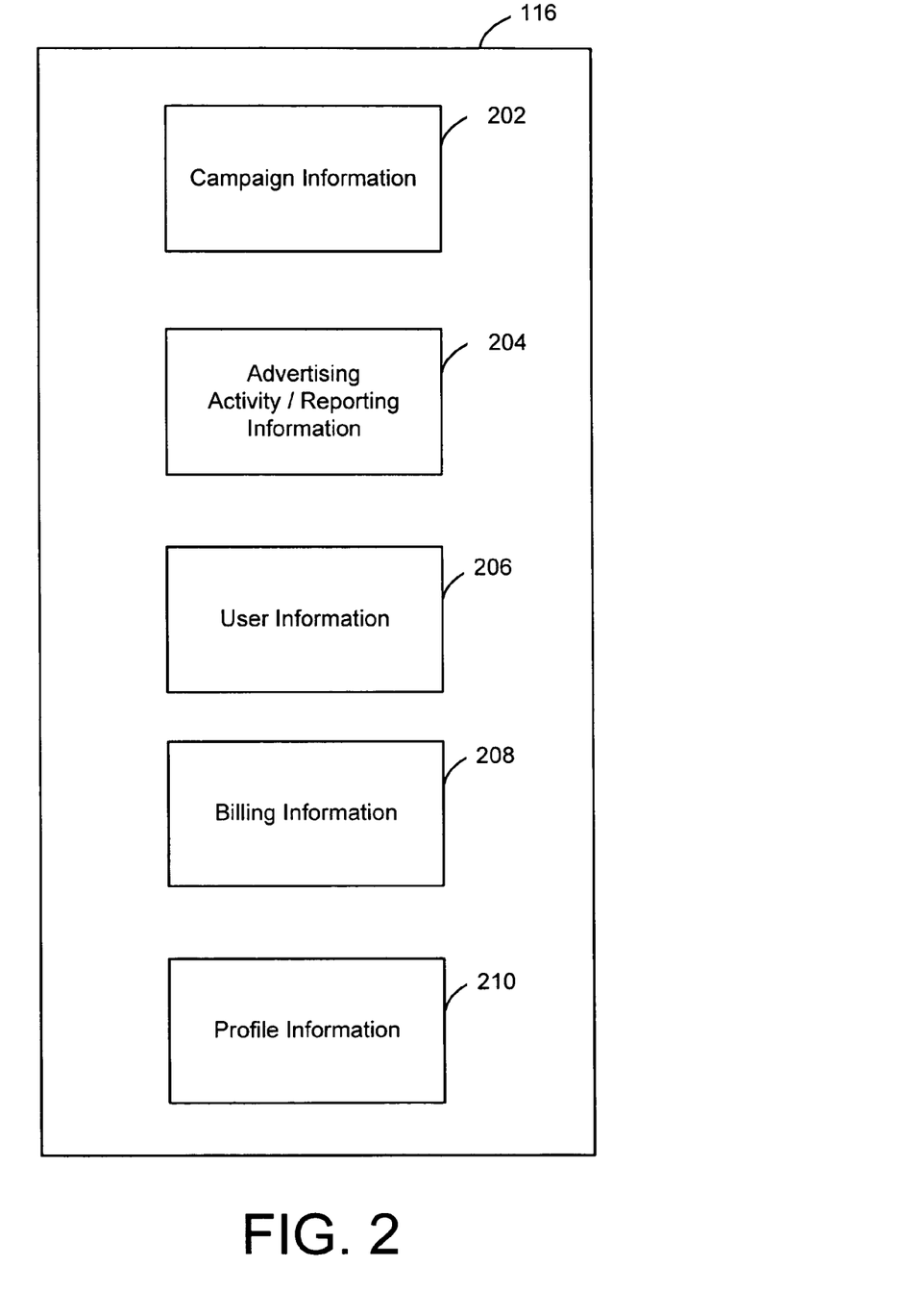
FIG. 2 is a schematic of an accounts database of the multiple user advertisement system of FIG. 1 according to an exemplary embodiment.

Referring to FIG. 2, information that may be stored in connection with accounts in accounts database 116 is shown in greater detail. Accounts database 116 may include campaign information 202, advertising activity/reporting information 204, user information 206, billing information 208, and profile information 210. Other information may also be stored in accounts database 116. Advertisement system 112 includes account management logic 118 which allows users of the system to access (e.g., view, change, update) certain types of the information stored in accounts database 116, and any such activity may be tracked by account management logic 118 for future reference by users of the system 112.

Campaign information 202 may include information related to one or more advertisement campaigns included in an advertisement account. For example, each advertisement campaign may comprise one or more advertisements, and information may be stored concerning both the advertisement campaign as a whole (e.g., campaign duration, campaign budget) and concerning individual advertisements within the advertisement campaign (e.g., advertisement creatives such as text, images, hyperlinks, etc.). In the case of a keyword bidding system, a keyword and keyword bid for placement of the advertisement on a publisher web page may also be stored. Additional information may also be stored, such as geographic targeting information (e.g., to target users in a specific location such as the United States, Canada, etc.), other bid or financial information related to the account, etc. For a publisher, campaign information may additionally include, for example, any advertisement preferences, restrictions on the advertisements that may be displayed on the web page (e.g., to allow for the exclusion of competitor advertisements, offensive material, etc.), financial information related to the account, and so on. Other campaign information may also be stored.

Advertising activity/reporting information 204 may include information used in generating reports, e.g., reports showing performance data for an overall advertisement account, individual advertisement campaigns, individual advertisements, bidded keywords, advertisement creatives, etc. The performance data may include, for example, financial performance, cost details, keyword performance, displays per day/week/month, clicks per display, clicks per day/week/month, cost per click, cost per transaction, other details relevant to the particular cost model being utilized to charge the advertiser for the placement of advertisements, etc. For a publisher, information 204 may include performance data that allows a publisher to determine, for example, which web pages generate the most revenue from advertising, etc. Additional advertising activity/report information may also be stored.

User information 206 may include information related to users of an advertisement account. For example, user information 206 may include, for each user, a user name, contact information (e.g., e-mail address), a user password, a user-unique identification code, etc. Status information for each user may also be maintained as a part of user information 206, including information indicating, for example, whether the user is currently invited, active, inactive, etc. Other information stored for each user may include whether the user has administrative responsibility for the account, whether the user has billing responsibility for the account, and so on. Additional user information may also be stored.

Billing information 208 may include bill payment history (e.g., invoice date, payment date, payment amount, credits, charges, account balance), current billing information (e.g., current amount due, date payment due, etc.), billing details (e.g., invoice or credit card payment method, responsible party or parties, payment terms, etc.), and/or other financial information related to the account. Additional billing information may also be stored.

Profile information 210 may include general account information, including an account name, account number, a creation date of the account, a contact name for the account, a business name of an entity associated with the account, address information for the entity associated with the account, and/or other high level data related to the management and overall activities of the advertisement account. Additional profile information may also be stored.

Figure 3:
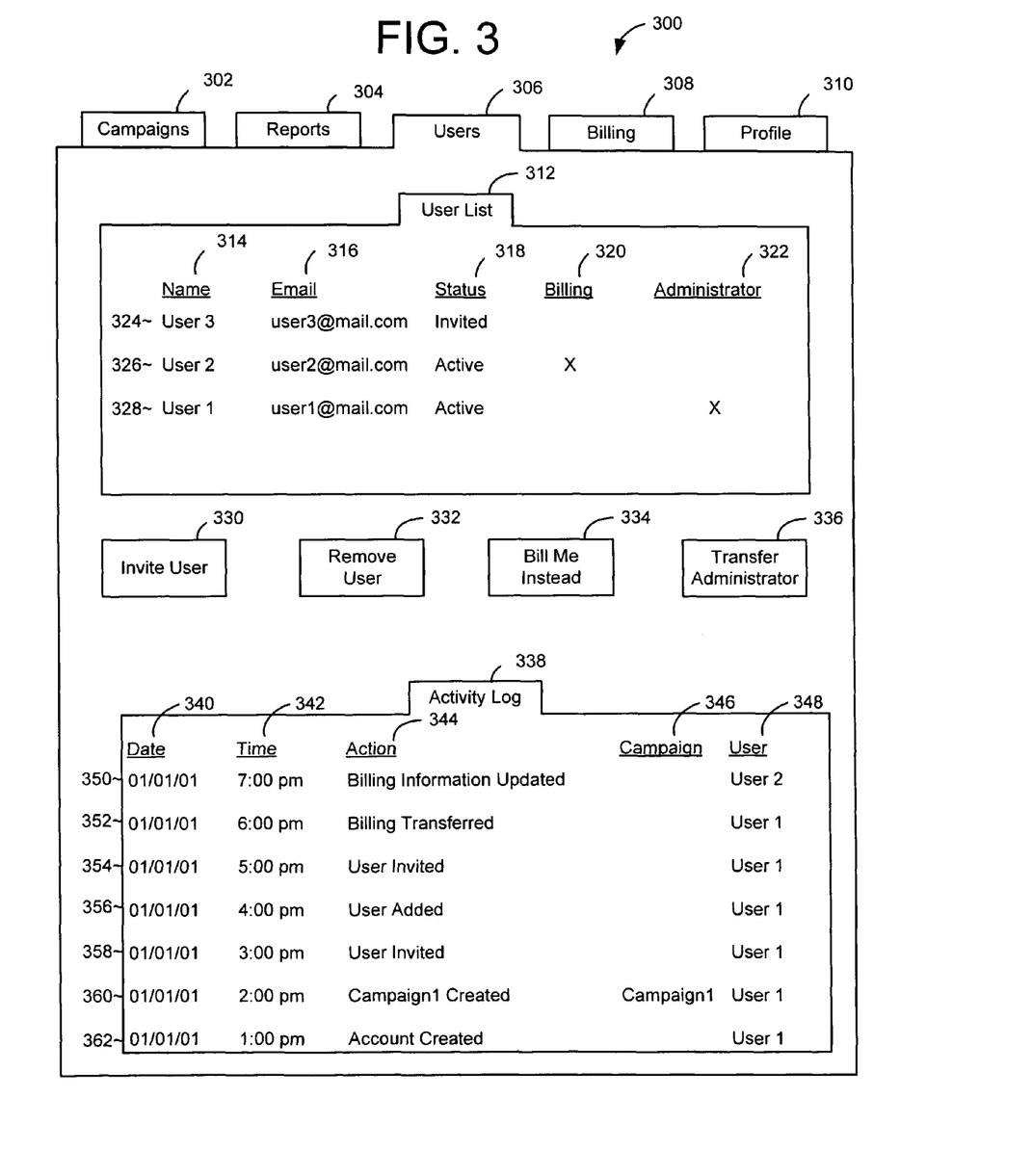
FIG. 3 is a screenshot of an exemplary web page with various tabs according to an exemplary embodiment.

Referring to FIG. 3, various tabs 302-310 are provided in a display, shown as screen display 300, that allow a user to access the information shown in FIG. 2. For example, display 300 may include campaigns tab 302, reports tab 304, users tab 306, billing tab 308, and profile tab 310 which allow users to access campaign information 202, activity/reporting information 204, user information 206, billing information 208, and profile information 210, respectively, in FIG. 2. For example, a user may select campaigns tab 302 to access (e.g., view, modify) campaign information 202. Other tabs may also be provided as a part of advertisement system 112. Display 300 is generated by advertisement system 112 and may be provided, for example, as a web page accessible using network 110. The information shown in display 300 may also be provided using other computer accessible mediums.

In an exemplary embodiment, all registered users of a particular advertisement account are granted identical or substantially similar access privileges. Thus, for example, each user may have the same level of access to view and modify the information that is accessible by way of each of the tabs 302-310. In the context of an advertiser, for example, the users that may be able to access information through tabs 302-310 may include both internal users (e.g., users in accounting department) and external users (e.g., users at marketing consultant firms). In another exemplary embodiment, the level of access provided to each user may also be configureable and certain types of users may be configurably-restricted from accessing certain types of information. For example, in an exemplary embodiment, certain billing information such as credit card numbers, bank account numbers, and other payment instruction details are maintained by advertisement system 112, but may be designated as not viewable or otherwise accessible by anyone except the user with billing responsibility.

Figure 8:
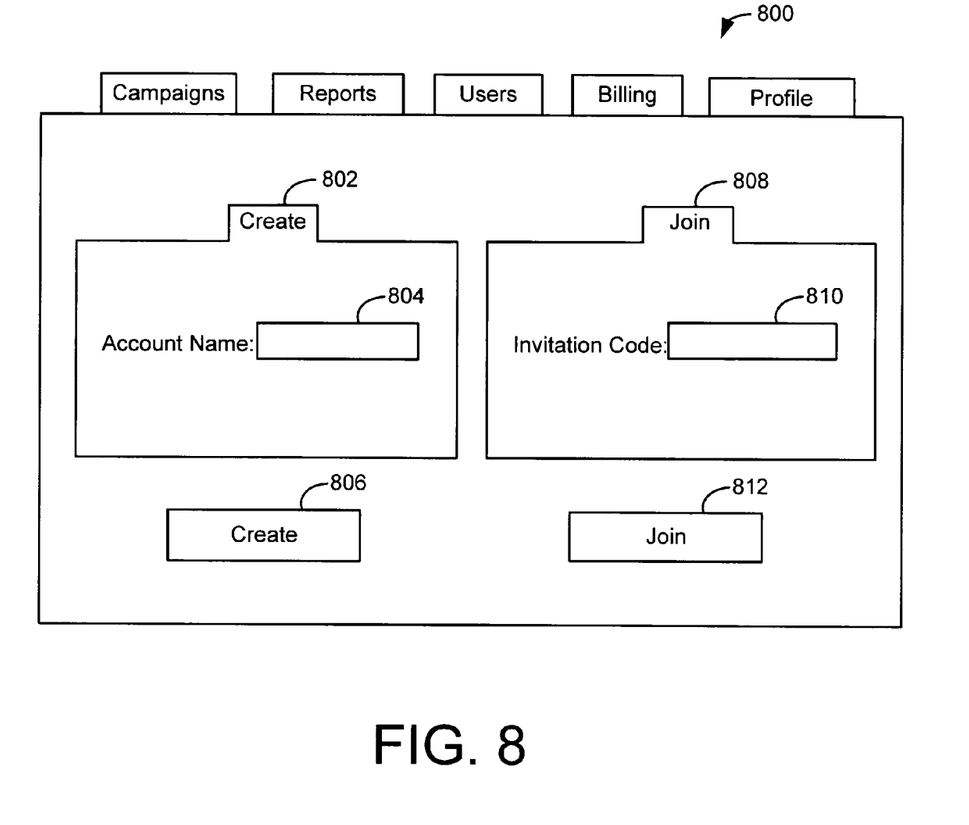
FIG. 8 is a screenshot of a web page for creating or joining a multiple user advertisement account according to an exemplary embodiment.

In FIG. 3, tab 306 is shown as being selected. Tab 306 includes information relating to the users of an advertisement account. The information may be compiled in, for example, a list such as user list 312. User list 312 includes information for each user, such as a user name 314, a user email 316, a user status 318, a billing indicator 320, and an administrator indicator 322. The user name 314 and email address 316 are the name and email address of the specific user as provided when the user either created or joined the account (as discussed further with respect to FIG. 8). The status 318 indicates the status of the particular user. For example, current users may be given a status of "Active," while invited users that have not yet been added may be given a status of "Invited." Billing indicator 320 and administrator indicator 322 indicate whether the user currently has billing or administrative responsibilities for the account, respectively. Other information may also be provided as a part of user list 312, and user list 312 may be modified to suit a particular advertisement account. For example, upon removing a user from an account, user list 312 may display the status of the user as "Removed." Alternatively, the user may be removed from user list 312 entirely.

Advertisement system 112 allows users to, among other things, invite additional users, remove current users, transfer administrative responsibilities, and transfer billing responsibilities. Referring further to FIG. 3, in an exemplary embodiment, display 300 includes user choices that users may select (e.g., by highlighting a user name and/or clicking on the appropriate choice using a mouse), including an invite user button 330, a remove user button 332, a transfer billing button 334, and a transfer administrator button 336. In an exemplary embodiment, only the creator of an account may invite users, remove users, or transfer administrative or billing responsibilities. In another exemplary embodiment, in addition to the creator of the account, users that have been given administrative or billing responsibilities by the creator of the account may in turn grant those responsibilities to a third or subsequent user. In another exemplary embodiment, billing responsibility may only be transferred by the user accepting the billing responsibility, e.g., so as to ensure that the user that is receiving billing responsibility is willing/able to accept responsibility. Accordingly, billing responsibility and/or administrative responsibility may be transferred responsive to an input from the user that is giving up responsibility, from the user that is receiving responsibility, and/or from another user, depending on the manner in which advertisement system 112 is configured.

Upon a user selecting invite user button 330, advertisement system 112 initiates the process of inviting a new user to an account (discussed in further detail below with respect to FIG. 5). In order to remove a user, or transfer administrative or billing responsibilities, a user may highlight the desired user and then select the appropriate button (i.e., remove user button 332, transfer billing button 334, or transfer administrator button 336). For example, to remove user 2, a user may highlight user 2 in user list 312 and then click on the remove user button 332. Advertisement system 112 then removes user 2 as a user of the account and from user list 312 (or alternatively, changes the status 318 of user 2 in user list 312 to "Removed"). Similarly, to grant administrative responsibilities to user 3, user 1, being the owner (e.g., creator) of the account, may highlight user 3 in user list 312 and click the transfer administrator button 336.

Further referring to FIG. 3, advertisement system 112 also allows users to view an activity log 338 reflecting actions taken by users of the account. A display 300 for advertisement system 112 may include an activity log 338. Activity log 338 is a part of advertisement system 112 and includes user information 206 relating to inputs received or actions taken by users of the account. Activity log 338 may include a date record 340, a time record 342, an action record 344, a campaign record 346, and a user record 348. Date record 340 and time record 342 represent the date and time the action was taken. Action record 344 includes a description of the action taken. Campaign record 346 indicates the related campaign(s), if any. User record 348 indicates the account user that performed the action. Other information (i.e., records) may be provided as a part of activity log 338.

In an exemplary embodiment, activity log 338 may be customized (i.e., configured by a user of advertisement system 112) such that the types of entries recorded in activity log 338 may be specified by a user. For example, activity log 338 may include only such activities as creating an account/campaign (e.g., entries 360 and 362), inviting/adding/removing a user (e.g., entries 354, 356, and 358), and changing billing information (e.g., entries 350, 352). Other types of activities may additionally be included in activity log 338 as desired. Further, advertisement system 112 may be configured to automatically remove entries from activity log 338 after a certain period of time (e.g., days, weeks, months, years, etc.). Activity log 338 may also be configured to display differing levels of details of account information. For example, activity log 338 may be configured to display information on an account level basis, a campaign level basis, advertisement level basis, and so on, and the information at the various levels may be aggregated among different accounts, campaigns, etc.

In another exemplary embodiment, advertisement system 112 allows a user to toggle between multiple separate advertisement accounts with different sets of registered users. For example, a user such as a marketing consultant with access to multiple accounts for different advertisers may log on to various advertisement accounts and toggle between accounts by accessing a listing of the various advertisement accounts. The user may direct advertisement system 112 to display information related to a specific account (e.g., information such as that shown in display 300) by, for example, highlighting the name of the account or clicking on an icon of the account. Other ways of indicating to advertisement system 112 which account a user wishes to view may also be used.

Figure 4:
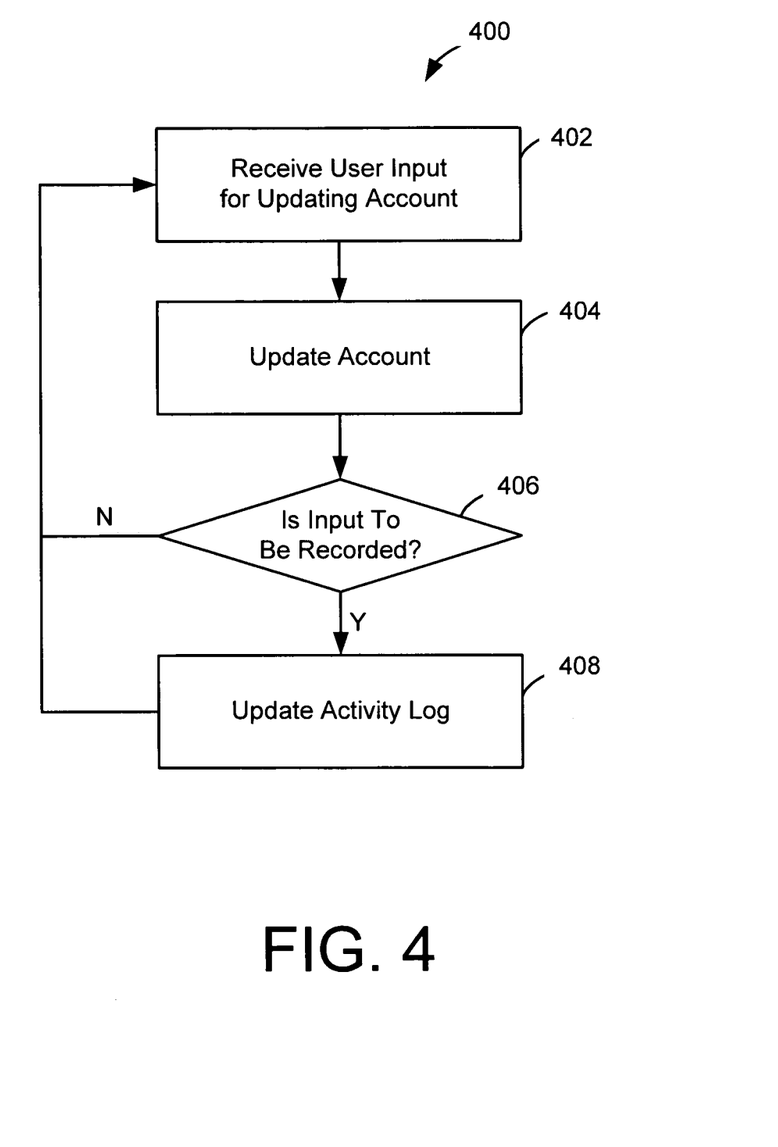
FIG. 4 is a flowchart illustrating the process of generating an activity log according to an exemplary embodiment.

Referring now to FIG. 4, a flowchart 400 showing the steps of generating entries stored in activity log 338 is shown. At step 402, advertisement system 112 receives an input from an account user (e.g., an input from a user directing advertisement system 112 to invite an additional user to an account).

At step 404, the account information stored in accounts database 116 is updated to reflect the user input received at step 402. For example, upon inviting a new user to the account, advertisement system 112 may store, among other information, a user name, a time, a date, etc., for the invited user.

At step 406, advertisement system 112 determines whether the input received has been defined as an action to be entered in activity log 338. If the input was not previously defined as an input to be entered in activity log 338, advertisement system 112 does not make an entry in activity log 338 for the input, but retains the data as a part of user information 206 (i.e., all updates/changes to the information stored in accounts database 116 are recorded).

At step 408, if the input was previously defined as an input to be entered in activity log 338, advertisement system 112 updates activity log 338 with an entry associated with the input (i.e., the user action taken), the entry including the date and time the action was taken, a description of the action, the relevant campaign, if any, and the user taking the action. An exemplary embodiment of such an activity log entry is entry 350 illustrated in FIG. 3.

Activity log 338 is continuously updated using the steps shown in FIG. 4 as advertisement system 112 receives inputs from users related to the account. Thus, the content of the activity log as viewed by a user at a certain time may differ from the content of the activity log as viewed by that or a different user at a prior or later point in time (i.e., activity log 338 may be dynamically generated and displayed to individual users of the account). In an exemplary embodiment, advertisement system 112 allows all active users of the account to view the information displayed as a part of activity log 338. For example, activity log 338 as shown in FIG. 3 may be viewed by user 1 and user 2 (i.e., the "Active" account users of the account) shown in user list 312.

Figure 5:
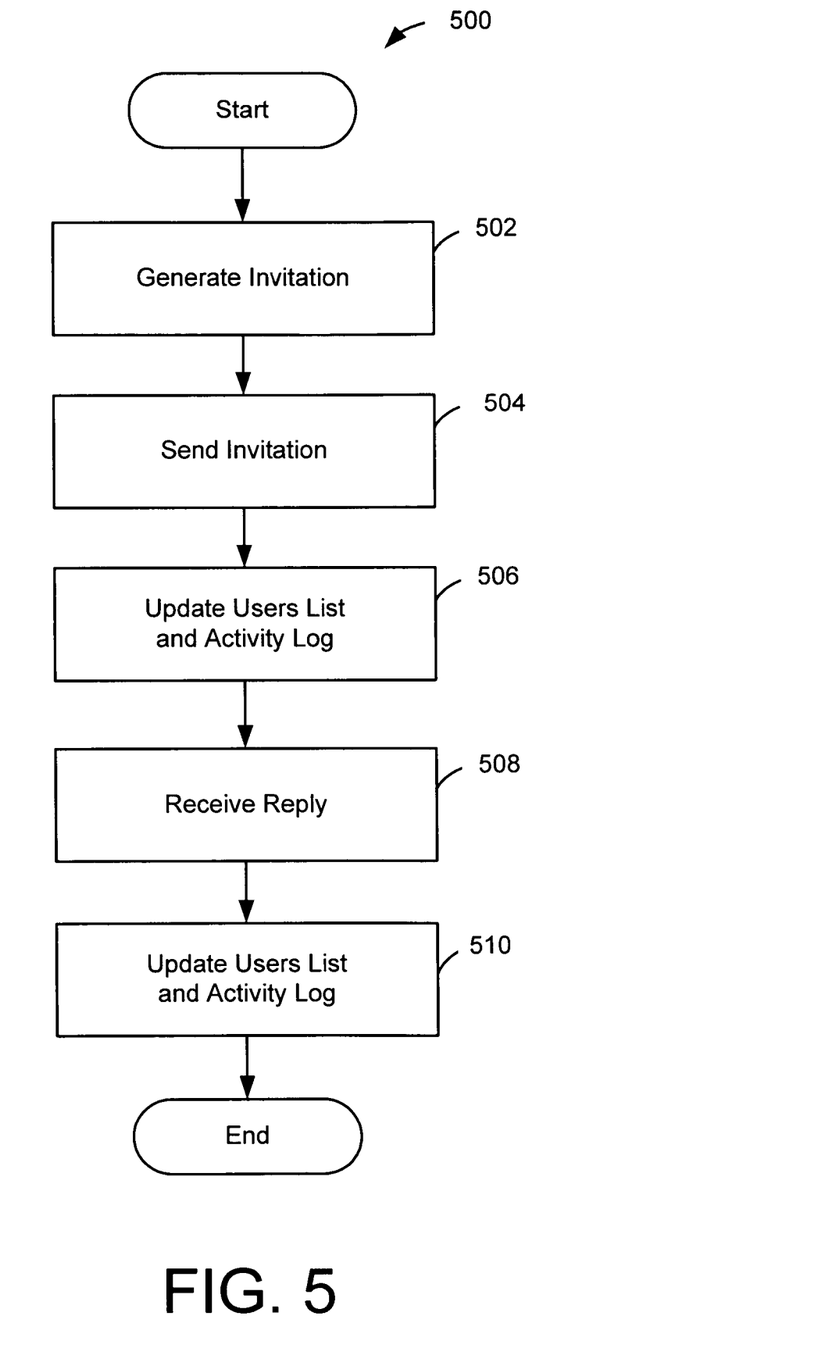
FIG. 5 is a flowchart illustrating the process of inviting a new user to a multiple user advertisement account according to an exemplary embodiment.
Figure 6:
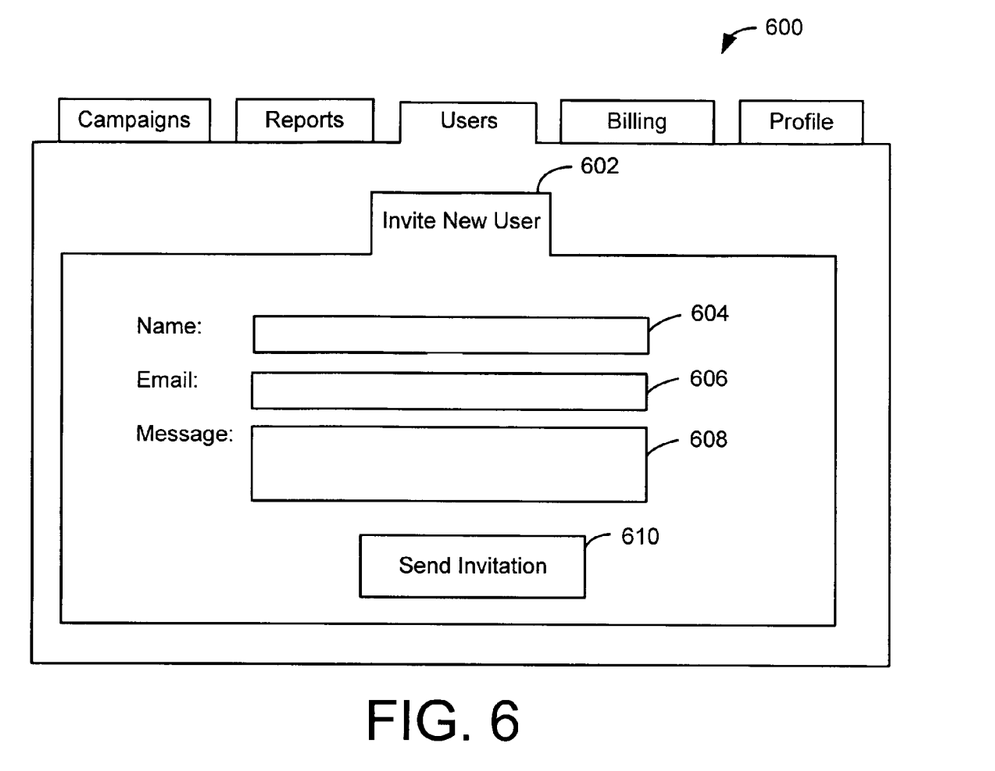
FIG. 6 is a screenshot of a web page for generating an invitation according to an exemplary embodiment.
Figure 7:
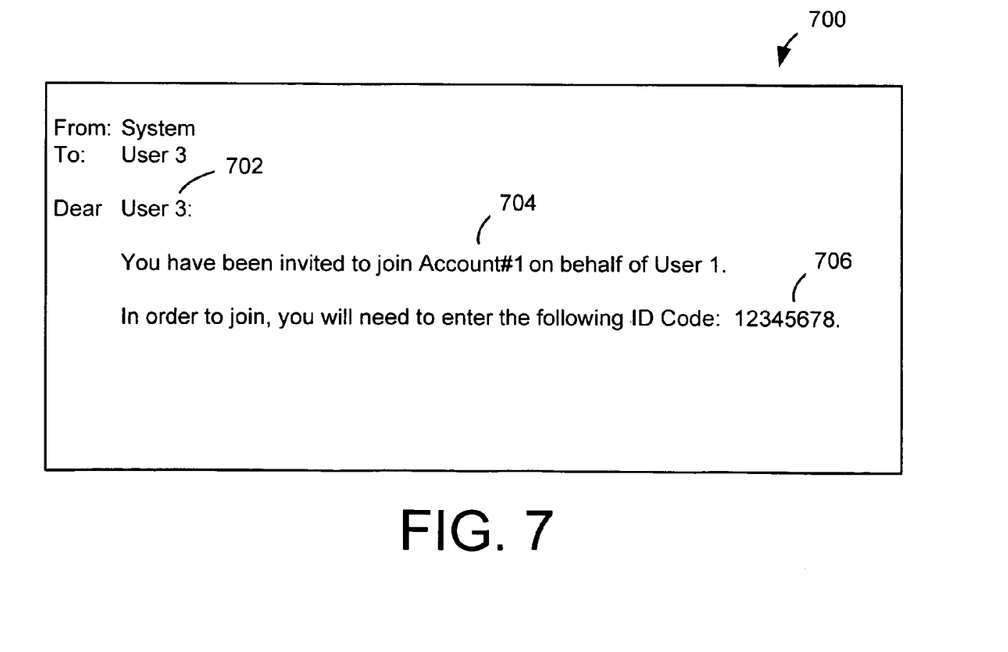
FIG. 7 is a screenshot of an electronic invitation used to invite a user to a multiple user advertisement account according to an exemplary embodiment.

Referring to FIG. 5, a flowchart 500 according to an exemplary embodiment shows the process of inviting a new user to an account and updating activity log 338 and user list 312 accordingly. At step 502, advertisement system 112 generates an invitation. In an exemplary embodiment, advertisement system 112 initiates the invitation process in response to a user input (e.g., a user clicking on a designated button on a web page, such as button 330 ("Invite User") shown in FIG. 3). In an alternative embodiment, other ways of initiating the invitation process, such as typing in a keyword or phrase, may be used at step 502. Advertisement system 112 receives the user input and then generates an invitation, shown in FIG. 7 as electronic invitation 700. Referring to FIGS. 6 and 7, in an exemplary embodiment, advertisement system generates invitation 700 in response to a user entering the information shown in FIG. 6. The information entered may include, among other information, a name 604 of the person to be invited (i.e., the "invitee"), an email address 606 of the invitee, and a personalized message 608 to be included in electronic invitation 700.

At step 504, advertisement system 112 electronically mails invitation 700 to the invitee. As shown in FIG. 6, invitation 700 may be sent by advertisement system 112 to the invitee (e.g., invitee 702) in response to a user choosing button 610 ("Send Invitation"). An account name 704 (shown as Account #1 in FIG. 7) identifies the name of the account to which the invitee is being invited. Additionally, invitation 700 includes an identification or invitation code 706, used by the invitee and advertisement system 112 to allow a user to join the existing account as illustrated further with respect to FIG. 8. In another exemplary embodiment, invitation 700 includes a hyperlink (not shown) enabling the invitee to link to the log-in or access web page for an advertisement account.

At step 506 (assuming, for purposes of illustration, that "inviting a user" has been defined as an input to be entered in activity log 338), advertisement system 112 updates activity log 338 to reflect the invitation having been sent to the invitee. An exemplary embodiment of such an entry is shown in FIG. 3 as entry 358. User list 312 is also updated to reflect the invitee having been invited to join the account. Entry 324 shown in FIG. 3 is an exemplary embodiment of how user list 312 may be updated to reflect inviting a new user to the account.

At step 508, advertisement system 112 receives a reply from the invitee. A reply may be generated through the use of a display such as display 800 (e.g., a web page) shown in FIG. 8. As discussed with respect to FIG. 7, electronic invitation 700 may include a link to display 800, allowing an invitee to go directly to display 800 from invitation 700. Advertisement system 112 and display 800 may allow a person to create a new account, by using button 806 ("Create") under the create sub-tab 802, and entering an account name into text box 804, and also allow an invitee to join an existing account. In order to join an existing account, an invitee may enter invitation code 706 into text box 810 under the join sub-tab 808 shown in FIG. 8 and then click on button 812 ("Join"). Advertisement system 112 then verifies that identification code 706 is valid (e.g., by verifying that the identification or invitation code entered into text box 810 matches the invitation code provided to the invitee via invitation 700). If the identification code is invalid for any reason, advertisement system 112 denies the invitee access to the account.

In an alternative embodiment, advertisement system 112 further requires an invitee to enter a user name and email address, either prior to or after entering invitation code 706. Advertisement system 112 then verifies that the email address entered by the invitee matches the email address to which the invitation 700 was sent. If the two email addresses do not match, advertisement system 112 may require further information from the invitee, or advertisement system 112 may deny the invitee access to the account. In another exemplary embodiment, if the two email addresses do not match, advertisement system 112 may send a verification email to the user that initiated the invitation process, for the invitee, e.g., to permit the user to indicate whether the alternative email address of the invitee is recognized and thereby whether access should be granted despite the different email address.

At step 510, upon properly verifying that the invitation code and/or email address provided by the invitee are valid, advertisement system 112 updates activity log 338 to reflect that a new user has been added to the account. An exemplary embodiment of such an entry is shown as entry 356 shown in FIG. 3. If the user has been denied access, no entry will be made in activity log 338. User list 312 is also updated accordingly to reflect whether the invitee is being added (e.g., by changing the status to "Active") or the invitee has been denied access to the account (e.g., by removing the invitee from user list 312). In another exemplary embodiment, the status of an invitee who has been denied access may remain as "Invited" or alternatively be changed to "Inactive."

Here and throughout, terms such as "user," "advertiser," "publisher," "visitor," and so forth are to be understood in the broadest possible sense. Herein, the term "user" is used generically to refer to advertisers, publishers, and visitors. By way of illustration and not of limitation, an "advertiser" may be an individual or a commercial, government, or non-profit entity; may be directly responsible for placing an advertisement, announcement, message, or the like, or may be a broker, reseller, or intermediary for another's advertisements, announcements, messages, or the like; may be advertising for its own products and services or may be advertising on behalf of another; may be represented by a human agent or by a web service, software agent, or other programmatic construct; etc. Likewise, a "publisher" is not restricted to persons or entities who purport to be in the on-line publishing business (or any other kind of publishing business), nor to entities who have complete or even primary control over the content of particular websites; but rather is used in a more general sense, and includes, for example, any person or entity responsible directly or indirectly for putting content on the Internet, whether by hosting or sponsoring websites, posting pages, frames, graphics, applets, blogs, audiovisual content, etc., on their own or others' websites, providing web services that can source content for websites, or in any other manner. Still further, a "visitor" may be an individual who visits and views or otherwise perceives the content of a website and pages therein via a web browser or other client software program running on a personal computer, wireless handheld device, or the like, but may also be, for example, a corporate or other entity whose servers access published web content and advertisements by invoking web services through appropriate application programming interfaces (APIs); a "visitor" may or may not be the intended or actual end consumer of a product or service that is the subject of an advertisement; etc. In sum, persons of skill in the art will appreciate that a wide variety of actors, more than can be conveniently set forth here, can play the roles of "advertiser," "publisher," and "visitor" for purposes of the present invention. It will be further appreciated that the self-same person or entity may be both "publisher" and "advertiser," or both "publisher" and "visitor," or both "advertiser" and "visitor", or even all three, depending on the context. In a similar vein, and as will be apparent from the foregoing, terms such as "web page," "website," and so (forth are used to give specific illustrative examples of settings in which on-line content and advertisements can be presented to and perceived by users. Such examples are not intended to be limiting, and persons of skill in the art will appreciate that many other such settings now known or yet to be developed may be suitable to the practice of the present invention in specific embodiments.

It should be noted that although flowcharts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps, and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems, and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented advertisement system for network-based advertising, comprising:
    a processing unit;
    a system memory coupled to the processing unit;
    an advertisement account database stored within the system memory and configured to direct the processing unit to store information related to a network-based advertisement account; and account management logic stored within the system memory in communication with the advertisement account database and configured to direct the processing unit to:

grant a plurality of users access to the advertisement account;

receive an input from one of the plurality of users of the account, wherein the input includes a request to transfer billing responsibility for the advertisement account;

update the advertisement account database in response to the input;

populate an activity log with information related to the input; and provide a display of the activity log that is accessible to the plurality of users.

2. The system of claim 1, wherein the input includes a request to create a new account.

3. The system of claim 1, wherein the input includes a request to invite a user to the advertisement account.

4. The system of claim 1, wherein the input includes a request to remove a current user from the advertisement account.

5. The system of claim 1, wherein the input includes a request to transfer administrative responsibility for the advertisement account.

6. The system of claim 1, wherein the input is received from the user to whom billing responsibility is to be transferred.

7. The system of claim 1, wherein the information related to the input includes a date and a time associated with the input.

8. The system of claim 1, wherein the information related to the input includes a user name of the user from which the input is received.

9. The system of claim 1, wherein the information related to the input includes a description of the user input.

10. The system of claim 1, wherein the information related to the input includes a campaign name.

11. One or more machine-readable storage media storing processor-executable instructions for generating an activity log for a network-based advertisement account, the instructions when executed, causing a computing device to perform acts comprising:

granting a plurality of users access to a computer-implemented advertisement account database configured to store information related to the advertisement account;

receiving an input from one of the plurality of users of the advertisement account;

updating the advertisement account database in response to the input;

transferring billing responsibility for the advertisement account responsive to the input;

populating the activity log with information related to the input; and generating a display including the activity log.

12. The one or more machine-readable storage media of claim 11, further storing processor-executable instructions that, when executed, cause the computing device to perform an act comprising creating a new advertisement account responsive to the input.

13. The one or more machine-readable storage media of claim 11, further comprising inviting a user to the advertisement account responsive to the input.

14. The one or more machine-readable storage media of claim 11, further comprising removing a user from the advertisement account responsive to the input.

15. The one or more machine-readable storage media of claim 11, further comprising transferring administrative responsibility for the advertisement account responsive to the input.

16. The one or more machine-readable storage media of claim 11, further comprising transferring billing responsibility to the user from whom the input is received.

17. One or more machine-readable storage media of claim 11, wherein the information related to the input includes a date and a time associated with the input.

18. The one or more machine-readable storage media of claim 11, wherein the information related to the input includes a user name.

19. The one or more machine-readable storage media of claim 11, wherein the information related to the input includes a description of the input.

20. The one or more machine-readable storage media of claim 11, wherein the information related to the input includes a campaign name.

21. The one or more machine-readable storage media claim 11, further comprising:

deleting the information related to the input from the activity log after a period of time.

22. The one or more machine-readable storage media of claim 21, further comprising receiving the period of time from one of the plurality of users of the advertisement account.

23. One or more machine-readable storage media storing processor-executable instructions for monitoring user actions related to a network-based advertisement account, the instructions, when executed, causing a computing device to perform acts comprising:

inviting a plurality of users to the advertisement account in response to an input received from the creator of the advertisement account;

granting access to the advertisement account to the plurality of users;

recording information associated with actions taken by the plurality of users, the actions being associated with the advertisement account; and generating a display of the information such that the plurality of users may view the information.

24. The one or more machine-readable storage media of claim 23, wherein granting access to the advertisement account includes receiving a unique identification code from each of the plurality of users.

25. The one or more machine-readable storage media of claim 24, wherein granting access to the advertisement account further includes confirming that an email address matches an email address stored in an advertisement account database.

26. The one or more machine-readable storage media of claim 23, wherein generating the display includes maintaining a network-based user activity log configured to display the information for a period of time.

27. The one or more machine-readable storage media of claim 26, further comprising providing plurality of users with the same level of access to campaign information in the advertisement account.

28. A computer accessible storage medium whose contents direct a computing system to:

receive an input from a user, the input relating to an advertisement account, wherein the input includes a request to transfer billing responsibility for the advertisement account;

update information stored in a database in response to the input, the information stored in the database being related to the advertisement account; and generate a display containing information related to the input;

wherein the information related to the input includes a time, a date, a description of the input, and a name of the user.

29. The computer accessible storage medium of claim 28, wherein the input includes a request to add a new user to the advertisement account.

30. The computer accessible storage medium of claim 28, wherein the input includes a request to remove a current user from the advertisement account.

31. The computer accessible storage medium of claim 28, wherein the input includes a request to transfer administrative responsibility for the advertisement account.

32. The computer accessible storage medium of claim 28, wherein billing responsibility is to be transferred to the user.

33. One or more machine-readable storage media storing processor-executable instructions for managing a multiple user network-based account, the instructions, when executed, causing a computing device to perform acts comprising:

inviting a plurality of users to the account in response to an input received from a creator of the account;

granting access to the account to the plurality of users based on receiving a unique identification code from each of the plurality of users, the access including access to financial information related to the account;

storing information related to actions taken by the plurality of users, the actions relating to the account; and generating a display of the information such that the information is viewable via a network by the plurality of users.

34. The one or more machine-readable storage media of claim 33, wherein inviting the plurality of users to the account includes sending electronic invitations to the plurality of users.

35. The one or more machine-readable storage media of claim 34, wherein granting access to the account further includes comparing an email address for each of the plurality of users to a set of email addresses used to send the electronic invitations to the plurality of users.

36. The one or more machine-readable storage media of claim 33, wherein storing the information related to actions taken by the plurality of users includes storing a time, a date, a user name, and a description for each of the actions taken by the plurality of users.

37. The one or more machine-readable storage media of claim 33, further comprising deleting the information related to the actions taken by the plurality of users after a period of time.

38. One or more machine-readable storage media storing processor-executable instructions for generating an activity log for a network-based multiple user advertisement account, the instructions, when executed, causing a computing device to perform acts comprising:

inviting a plurality of users to join the advertisement account, wherein inviting each user of the plurality of users includes:

generating an electronic invitation including a link to an access web page, an account name, and an invitation code;

electronically sending the electronic invitation to the user;

receiving an input from the user via the access web page; and granting access to the advertisement account to the user if the input matches the invitation code;

storing information related to actions taken by the plurality of users;

populating an activity log with a portion of the information, the portion of the information including a user name, a date, a time, and a description for each action; and generating a display of the activity log such that the plurality of users may view the portion of the information contained in the activity log;

wherein the actions taken by the plurality of users and populated in the activity log include:

inviting a new user to the advertisement account;

removing a current user from the advertisement account;

transferring billing responsibility for the advertisement account; and transferring administrative responsibility for the advertisement account.

\* \* \* \* \*